Patented Oct. 29, 1935

2,019,123

UNITED STATES PATENT OFFICE 2,019,123

MERINGUE COMPOSITION

Ernest F. Erickson, Oak Park, Ill., assignor to Standard Brands Incorporated, New York, N. Y., a corporation of Delaware No Drawing. Application March 11, 1933, Serial No. 660,439

6 Claims. (Cl. 99—11)

This invention relates to meringue compositions and a method of making the same; more particularly, meringue compositions for pastries, for example filled pies.

The invention has for a general object the provision of a meringue composition which is of pleasing taste, increased volume and stable, and which will efficiently withstand the usual handling to which meringues are subjected in commercial procedures. The invention also provides an efficient method for the preparation of a meringue.

More specific objects of the invention are the provision of a meringue composition prepared with fresh or frozen egg whites which will withstand rough handling; and a method of efficiently making such meringues with the use of a starch paste.

Other objects of the invention will in part be obvious and will in part appear hereinafter.

The invention accordingly comprises the several steps and the relation of one or more of such steps with respect to each of the others, and the product possessing the features, properties and the relation of constituents, which are exemplified in the following detailed disclosure. The scope of the invention will be indicated in the claims.

Prior to the present invention meringue compositions such as those used on filled pies were prepared with the use of whip powders since it was found that the resultant meringue withstands rougher handling, particularly that to which they are subjected on delivery wagons, than do meringues prepared with the use of fresh or frozen egg whites. The present invention makes possible the use of fresh or frozen egg whites in the preparation of meringues which are of markedly greater volume, pleasing taste and will effectively withstand rough handling.

In the practice of the present invention a meringue composition may be prepared utilizing a sugar solution (containing an acid-reacting aerating agent, for example, tartaric acid and its salts, such as cream of tartar), whipped egg whites, and a boiled starch paste. This meringue composition is well adapted for use on pastries such as filled pies.

In accordance with a preferred method a sugar solution is boiled to a temperature of about 240° F. or higher. Higher temperatures make the body of the resultant meringue composition much stiffer. It is then beaten into whipped fresh or frozen egg whites which have been, if desired, sweetened and flavored. The whipping is continued until the resultant mixture is firm. A starch paste is prepared by boiling an edible starch, such as corn starch, in water. This starch paste, while hot, is then beaten into a hot mixture prepared from the sugar solution and whipped egg whites. The meringue composition may then be used in the usual manner, for example, spread upon filled pies, which are then browned in an oven at about 375° F. The amount by weight of the sugar solution is at least twice, and preferably between about two and a quarter and two and a half times that of the egg whites whip and the amount by weight of the starch paste is about equal to or a little more than that of the egg whites whip. The starch paste acts as an absorbent for the excessive water in the eggs and stiffens the body of the meringue composition. This meringue composition has a desirably great volume and pleasing taste and, when applied to pastries, is sturdy and will withstand rough handling.

Preferred formulas, set forth below, are given by way of example:

I 1 pound water, 3½ pounds sugar, or more, depending on the sweetness desired (more sugar will tend to give a firmer meringue composition), and ½ ounce cream of tartar, or similar material such as that commercially known as "Fleischmann's Cream", or calcium acid phosphate, sodium acid pyro phosphate, etc., are mixed together and heated until the resultant syrup is boiling at a temperature of between about 240° F. and 250° F. While the sugar syrup is being heated 2 pounds of egg whites, with added flavoring material if desired are beaten until about one half whipped. The hot syrup is then added and the beating is continued until the resultant mixture is firm.

5 ounces corn starch, and 8 ounces water are mixed together and added to about 24 ounces boiling water. The resultant paste is stirred well until smooth and thick. The boiled starch paste, while hot, is then mixed into the hot syrup-whip mixture and the resultant composition stirred until it is smooth. The amount of starch in the above formula may be varied to obtain the desired degree of thickness of the paste, about 5 ounces being preferred, however, such amount having been found to give suitable results.

II 12 ounces water, 1½ pounds sugar, and ⅛ to ¼ ounce cream of tartar, or similar material such as that commercially known as "Fleischmann's Cream", or calcium acid phosphate, sodium acid pyro phosphate, etc., are mixed together and heated until the resultant syrup is boiling at a temperature of between about 240° F. to 243° F. While the sugar syrup is being heated 1 pound egg whites, 4 ounces sugar, and flavoring material, such as vanilla, in an amount to satisfy the taste are beaten together. When the syrup has reached the desired temperature, it is poured slowly into the whipped egg whites and the mixture is whipped until firm.

2½ ounces corn starch, and 4 ounces water are mixed together and added to about 12 ounces of boiling water. The resultant starch paste is stirred well until smooth and thick. The boiled starch paste, while hot, is then mixed into the hot syrup-whip mixture and the resultant composition stirred until it is smooth.

It will thus be seen that the objects set forth above are efficiently attained. Since certain changes in carrying out the above process and certain modifications in the composition which embody the invention may be made without departing from its scope, it is intended that all matter contained in the above description shall be interpreted as illustrative and not in a limiting sense and it is to be understood that in the claims, ingredients or compounds recited in the singular are intended to include compatible mixtures of such ingredients wherever the sense permits.

Having described my invention, what I claim as new and desire to secure by Letters Patent, is:

1. A method of making a meringue composition which consists in heating a mixture of sugar, water and an acid-reacting aerating agent, whipping the heated mixture into whipped egg whites, continuing the whipping until the resultant mixture is firm, preparing a hot starch paste from water and an edible starch, and mixing the hot starch paste with the syrup-egg whites mixture.

2. A method of making pastry meringue composition which consists in heating a mixture of sugar, water and an acid-reacting aerating agent to a temperature of at least about 240° F. to form a syrup, preparing a sweetened egg whites whip in amount by weight about one half of that of the syrup, whipping the hot syrup into the whip and continuing the whipping until the resultant mixture is firm, preparing a starch paste from hot water and edible starch in amount by weight about one third of that of the syrup-whip mixture, and mixing the hot starch paste with the syrup-whip mixture.

3. A method of making pastry meringue composition which consists in heating a mixture of sugar, water and an acid-reacting aerating agent to a temperature between about 240° F. and 250° F. to form a syrup, preparing a whip from egg whites, mixing the whip and hot syrup, whipping the mixture until firm, preparing a starch paste from corn-starch and boiling water, and mixing the hot starch paste with the hot syrup-whip mixture, said syrup containing its ingredients in the proportion of between about 65 per cent and 80 per cent by weight of sugar, between about 20 per cent and 35 per cent by weight of water and between about .3 per cent and .7 per cent by weight of aerating agent, said whip consisting chiefly of egg whites, and said starch paste containing its ingredients in the proportion of about 13 per cent by weight of corn-starch and about 87 per cent by weight of water, the amount of said syrup, said whip and said paste in said composition being in about the relative proportions of 2:1:1.

4. A method of making a meringue composition which consists in preparing a mixture of sugar, water and an acid-reacting aerating agent, adding the mixture to whipped egg whites and whipping until the resultant mixture is firm, preparing a hot starch paste from water and an edible starch, and mixing the hot starch paste with the syrup-egg whites mixture.

5. A meringue composition comprising a sugar syrup containing an acid-reacting aerating agent, an egg-whites whip, and a boiled starch paste present in an amount sufficient to absorb excess water and stiffen the meringue.

6. A meringue composition comprising a sugar syrup containing an acid-reacting aerating agent, an egg-whites whip, and a boiled starch paste; the amount of said syrup being by weight about twice that of the whip, and the amount of said starch paste being such as to serve as an absorbent for the excess water in said whip.

ERNEST F. ERICKSON.